US006126783A

United States Patent [19]

Gill

[11] Patent Number: 6,126,783

[45] **Date of Patent: *Oct. 3, 2000**

[54] SURFACE MODIFIED FILLERS FOR SIZING PAPER

[75] Inventor: Robert Anthony Gill, Bethlehem, Pa.

[73] Assignee: Minerals Technologies Inc., Bethlehem, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 09/112,414

[22] Filed: Jul. 9, 1998

[51] Int. Cl.[7] .................................................... D21H 11/00

[52] U.S. Cl. ....................... 162/164.6; 162/158; 162/183; 106/465

[58] Field of Search ................................ 162/158, 164.1, 162/164.6, 164.7, 168.1, 168.2, 168.3, 182, 183, 184, 185; 106/465

[56] References Cited

U.S. PATENT DOCUMENTS

| | | | |
|---|---|---|---|
| 3,976,824 | 8/1976 | Ariyoshi | 526/23 |
| 4,234,378 | 11/1980 | Iwasaki et al. | 162/138 |
| 4,425,405 | 1/1984 | Murakami et al. | 428/342 |
| 5,147,507 | 9/1992 | Gill | 162/158 |
| 5,380,361 | 1/1995 | Gill | 106/465 |
| 5,411,639 | 5/1995 | Kurrle | 162/175 |
| 5,514,212 | 5/1996 | Kurrle | 106/465 |
| 5,527,430 | 6/1996 | Gill | 162/158 |
| 5,865,951 | 2/1999 | Kawakami et al. | 162/158 |

FOREIGN PATENT DOCUMENTS

| | | |
|---|---|---|
| 0 292 975 | 11/1988 | European Pat. Off. . |
| 0 468 280 | 1/1992 | European Pat. Off. . |
| 0 579 447 | 1/1994 | European Pat. Off. . |
| 0 819 793 | 1/1998 | European Pat. Off. . |

OTHER PUBLICATIONS

Abstract, Paper Coating Composition Offset Gravure Print Paper Mixture Mineral Pigment Synthetic Organic Pigment Pigment Bind, JP60199997 A 851009.

Abstract, Gravure Printing Coating paper High Stiff Opaque Wood Pulp Coating Pigment Bind Composition Contain Styrene Butadiene Copolymer Resin, JP7102499 A 950418.

Abstract, Polyacrylic Polymer Composition Foam Fibre Produce Comprise Polyacrylic Polymer Contain Polyacrylonitrile Water Hydrophobic Oligomer Polyethylene, JP57195763 A 821201.

Abstract, Paper Size High Dissociate Properties Wide Range pH Value Add Size Agent Size Fix Agent Comprise Cation Polymer Amidine Structure Aqueous Slurry Pulp High Adsorb Pulp, JP6248597 A 940906.

*Primary Examiner*—Stanley S. Silverman
*Assistant Examiner*—Robert McBride
*Attorney, Agent, or Firm*—Marvin J. Powell; Terry B. Morris

[57] ABSTRACT

A hydrophobic filler material for neutral, alkaline and acidic papers is disclosed. The filler material comprises finely divided particles of an inorganic material, in admixture with a water miscible, butyl acrylate-acrylonitrile copolymer. A neutral or alkaline paper is disclosed. The neutral or alkaline paper comprises a hydrophobic filler material comprising inorganic material, in admixture with a water miscible, butyl acrylate-acrylonitrile copolymer. A method for improving sizing characteristics of neutral or alkaline paper is disclosed, comprising preparing a filler material and adding the same to cellulose fiber. The filler material is prepared by selecting particles of an inorganic material and admixing with a water miscible, butyl acrylate-acrylonitrile copolymer, forming a hydrophobic system.

1 Claim, No Drawings

SURFACE MODIFIED FILLERS FOR SIZING PAPER

FIELD OF INVENTION

The present invention relates to inorganic paper filler systems. More specifically, the present invention relates to surface-modified fillers that are useful in paper-making processes where sizing is important. Even more specifically, the present invention relates to the use of polymeric compositions as modifiers of inorganic fillers and their subsequent use to improve the sizing in neutral, alkaline and acid paper-making processes.

BACKGROUND OF THE INVENTION

Increasing the filler content of paper can provide the paper maker with numerous benefits, including savings in raw material costs, enhanced optical properties, and better print quality. There are, however, limits to the amount of filler that can be substituted for paper-making fiber. When the filler levels approach and exceed about 20 percent, paper can suffer losses in strength, stiffness and sizing. Unmodified fillers, such as clay, titanium dioxide and calcium carbonate, are known to have a detrimental effect on strength and sizing. Additionally, increasing the concentration of filler in the paper-making furnish results in increased size agent demand to maintain the desired hydrophobicity, water repellency, in the finished paper.

Sizing agents are generally added to cellulose fibers during the paper-making process to impart hydrophobicity to the paper. Resistance to liquid penetration is necessary to prevent the paper from breaking down when the paper is passed through a size press starch solution prior to drying. Resistance to liquid penetration is also necessary so that print quality of the paper can be maintained when printing ink is used on the surface of the paper. In particular, poor sizing efficiency is associated with the use of alkyl ketene dimer (AKD) and alkenyl succinic anhydride (ASA) sizing agents and calcium carbonate pigments, particularly in highly filled alkaline papers or neutral papers. It is believed that the sizing agents may be lost or rendered ineffective from the furnish due to a disproportionate fraction of a sizing agents being absorbed on the high surface area filler in the furnish. Therefore, the effectiveness of the sizing agent is reduced and the cost of the paper making process is increased due to an increase in sizing agent demand. In addition, strength properties decrease as filler levels increase, impacting negatively on the paper making operation, as well as the use of the paper as a final product. Consequently, in circumstances where increasing the filler content would be advantageous, associated sizing problems continue to occur affecting paper quality, machine performance, machine runability, and end use functionality.

The mechanism by which AKD, ASA, rosin or modified rosin agents impart hydrophobicity to cellulose fibers is somewhat controversial. However, it is generally accepted that when synthetic sizing agents, such as AKD or ASA, are used in neutral or alkaline and rosin or modified rosin agents in acidic paper-making processes, there remains a need for reducing the detrimental effects of the use of such agents on the paper-making process as well as the physical properties of the final sheet.

What is required is an inorganic base filler material that can be employed in a neutral, alkaline or acidic-making process where either an AKD or an ASA sizing agent is employed while the detrimental effects on the paper-making process and the physical properties of the final sheet are minimized.

It is therefore an object of the present invention to provide a filler that is useful in improving the sizing of neutral, alkaline and acid papers. Another object of the present invention is to provide a neutral and alkaline paper having improved sizing characteristics. Another object of the present invention is to provide a filler material that improves sizing when modified with an acrylic copolymer. A further object of the present invention is to provide an improved sizing in systems where rosin or modified rosin sizing agents are employed. Still a further object of the present invention is to provide a finished paper sheet having improved printability. These and other objects will further be disclosed and apparent in the Detailed Description of the present invention that follows.

RELATED ART

U.S. Pat. No. 5,147,507 discloses a chemically modified precipitated calcium carbonate filler which has been surface-treated with a cationic polymer as a means of reducing the amount of sizing agent that is used in the paper-making process while improving other physical properties of the paper.

U.S. Pat. No. 5,411,639 discloses a paper-making process with improved sizing that results from the use of a calcium carbonate pigment that is surface-treated with an anionic starch-soap complex. The patent also alleges that the surface-treated pigment will allow the paper maker to increase filler content of the paper without negatively influencing dry strength properties.

U.S. Pat. No. 5,514,212 discloses an inorganic calcium carbonate pigment, having precipitated on the surfaces in the presence of a divalent and trivalent ions, a starch-soap complex where the starch component is an oxidized starch or an unmodified starch, and the starch component contains fatty acids such as oleic, stearic and palmitic. The patent further alleges that the paper making process will improve sizing efficiency by the use of the calcium carbonate pigment surface treated with an anionic starch-soap complex.

U.S. Pat. No. 5,380,361 discloses a hydrophobic filler material having finally divided particles of inorganic materials, a water-soluble fatty acid and a metal ion. The patent further alleges that the hydrophobic filler is useful in alkaline paper-making processes where sizing of the finished paper product is important.

U.S. Pat. No. 5,527,430 discloses an alkaline paper containing a hydrophobic filler material having an inorganic material, a fatty salt that coats the inorganic particles and an alkaline sizing agent of a alkenyl succinic anhydride or an alkyl ketene dimer. The patent further alleges that alkaline papers containing the hydrophobic filler produced according to the process of this invention improves the sizing of alkaline paper.

SUMMARY OF THE INVENTION

The present invention relates to a composition of inorganic particles and an acrylonitrile copolymer, with a sizing agent optional, for use in papermaking. The inventive composition can further include cellulose fibers. One objective of the present invention is to provide paper filling or coating material having improved sizing characteristics. An advantage is the attaining of an unexpected improved sizing characteristic for such filling or coating material while using the same amount of copolymer as for compositions not effectively formed.

DETAILED DESCRIPTION OF THE INVENTION

One embodiment of the present invention is a composition comprising one or more inorganic particle(s) and an acrylonitrile copolymer wherein the one or more inorganic particle(s) and the acrylonitrile copolymer effectively interact to unexpectedly significantly enhance the hydrophobic property of the one or more inorganic particle(s).

The inorganic particle(s) of the present invention can be any inorganic particle(s) which can effectively interact with a hereinafter described acrylonitrile copolymer to significantly enhance the hydrophobic property of the inorganic particle(s). Accordingly, even though the present invention is exemplified hereinafter with particularly described inorganic particles having specified composition, structures and sizes, the present invention includes any inorganic particle which hydrophobic property is enhanced as hereinafter described. The presence of an enhancement for a particular particle can depend on the particular application of the particle as a component of an article.

In a preferred embodiment of the present invention, the inorganic particle is one which can be used as a coating or filling material in a paper product. Non-limiting examples of such paper products include white paper, groundwood paper, board paper, paper made with bagasse, cloth and the like. Preferred inorganic particle(s) contain calcium carbonate, such as ground calcium carbonate minerals or precipitated calcium carbonate; clays, such as Kaolinite and Bentonite; talc; and titanium dioxides.

Such inorganic particle(s) typically can have an equivalent spherical diameter of from about 0.1 micron to about 10 microns. Notwithstanding such, the present invention can be practiced with particles of either lesser or greater than such size, the criticality of the size being related to the effect of the size on the interaction with the selected acrylonitrile copolymer to achieve the desired degree of hydrophobicity.

The acrylonitrile copolymer of the present invention is a copolymer comprising one or more of the same or differing acrylonitrile monomer(s) and one or more comonomer(s).

An "acrylonitrile monomer" is preferably the unsubstituted moiety having the formula [—$CH_2$—C(CN)H—], but can have substitution(s) on such moiety as long as such does not prevent the hydrophobic enhancement. The comonomer (s) is one which does not prevent the hydrophobic enhancement of the present invention, and may, in fact, achieve even greater enhancement. Although the comonomer may be an acrylonitrile monomer or some other monomer, the preferred comonomer is selected from a group consisting of butylacrylate monomer [—$CH_2$—CH(—$CO_2C_4H_9$)—], butylmethacrylate monomer [—$CH_2$—CH(—$CH_3$)(—$CO_2C_4H_9$)—], 2-ethylhexylacrylate monomer [—$CH_2$—CH(—$CO_2$ $CH_2CH$(—$C_2H_5$) $C_4H_9$)—], 2-hydroxyethylacrylate monomer [—$CH_2$—CH(—$CO_2C_2H_4OH$)—], methylmethacrylate monomer [—$CH_2$—C(—$CH_3$)—CH(—$CO_2CH_3$)—], styrene monomer [—CH(—$C_6H_6$)—$CH_2$—], vinylacrylate monomer [—$CH_2$—CH(—$CO_2$CH=CH)—] or [—$CH_2$—CH(—$CO_2$CH(—)CH(—))—]. As for the acrylonitrile monomer described hereinabove, the comonomer can have substituents as long as such does not prevent attaining the hydrophobic enhancement.

In a preferred embodiment, the inventive acrylonitrile copolymer consists of acrylonitrile monomers, butylacrylate monomers and styrene monomers; more preferably consists of acrylonitrile monomers and butylacrylate monomers.

The selected acrylonitrile copolymer to be used in the present invention is one which is dispersible in an aqueous media and can have a molecular weight ranging in a magnitude of thousands to tens and hundreds of thousands to millions. Similarly, the ratios of monomers to one another can range from unity to tens to hundreds, it being understood the degree of hydrophobic property can be a function of the differing ratios.

The inorganic particle(s) and the acrylonitrile copolymer of the present invention effectively interact to unexpectedly significantly enhance the hydrophobic property of the particle(s) of the present invention. The "hydrophobic property" of the inorganic particle(s) is that property of the particles which is manifested by the resistance to flow of a liquid, such as penetration by water, through an article which is made, at least in part, with the particle(s), and which can be also a measure of degradation, if present, of the inorganic particle(s) through reaction with the liquid.

Accordingly, the hydrophobic property of the inorganic particle(s) is deemed to be significantly enhanced if an article made, at least in part, with the composition of the present invention manifests a measurable enhanced resistance to liquid penetration compared to the article made similarly with the inorganic particle(s) without the presence of the acrylonitrile copolymer or, at least, its effectively interacting with the inorganic particle(s). Accordingly, a non-limiting example of a demonstrated enhanced hydrophobic property is a meaningful increase (e.g. beyond experimental error or other artifact) in a Cobb Test or Hercules Sizing Test of a paper made with the present invention over a paper made without the acrylonitrile copolymer or, if the acrylonitrile copolymer is present, without the acrylonitrile copolymer having been effectively interacted with the inorganic particle(s). The significantly enhanced hydrophobic property is preferably at least about 25 percent greater, more preferably at least about 50 percent greater, than the measured properties of articles without benefit of the present invention.

Another embodiment of the present invention is the above-described inventive composition further comprising a sizing agent. A "sizing agent" can be defined as a material which retards the absorption of water into a composition which contains the sizing agent, such as a paper composition or as a material which protects other material from adverse liquid attack, a non-limiting example being that of water decomposing filler in a paper composition. One method of identifying a material which is acting as a sizing agent in a paper composition is by industrially accepted tests, such as the Cobb method, use of a Hercules Size Tester or the like, as indicated above. Preferred sizing agents are alkyl ketene dimers, alkenyl succinic anhydrides, and modified rosin synthetic sizing agents.

In another embodiment, the present invention is a composition comprising inorganic particle(s), an acrylonitrile copolymer, and cellulose fibers, wherein the inorganic particle(s) and acrylonitrile copolymer effectively interact to unexpectedly significantly enhance the hydrophobic property of the particle(s). In a further embodiment, such composition further comprises one or more sizing agent(s). In such embodiments, the preferred acrylonitrile copolymer comprises butylacrylate monomers.

In the practice of the present invention, the selected inorganic particle(s) and acrylonitrile copolymer(s) are effectively interacted to significantly enhance the hydrophobic property of the particle(s).

Such enhancement can be measured by known tests, such as the above-described Cobb method, Hercules Size Tester and the like. Preferably, the significant enhancement is at least about a 25 percent increase in sizing character, more preferably at least about 50 percent.

Such effective interaction can be achieved by convenient methods of mixing known in the art. The interaction is preferably performed in liquid or aqueous solutions. Accordingly, an embodiment of the invention is achieved by forming a solution of the inorganic particle(s) and by forming a solution of the acrylonitrile copolymer. The solution of the inorganic particle(s) and the solution of the acrylonitrile copolymer can be two separate solutions which are admixed to arrive at a single solution of both inorganic particle(s) and acrylonitrile copolymer(s) or can be the same solution into which the inorganic particle(s) and the acrylonitrile copolymer(s) are introduced in any of a variety of sequences and means. For example, such could be by sequential or simultaneous or overlapping addition streams. Means of co-mingling, mixing and agitation can be used advantageously to achieve the effective interaction required for the present invention. The effective interaction can be accompanied by either or both of chemical or physical mechanisms. Examples of such could include bonding of the inorganic particle(s) and the acrylonitrile copolymer(s), coating or layering of the acrylonitrile copolymer(s) onto the inorganic particle(s), encapsulation of the inorganic particle (s) by the acrylonitrile copolymer(s), formation of matrix by the acrylonitrile copolymer(s) within which are dispersed the inorganic particle(s).

In yet another embodiment, the present invention is a method comprising admixing one or more inorganic particle (s), one or more acrylonitrile copolymer(s) and a paper furnish to form a modified paper furnish and forming a paper sheet from the modified paper furnish, wherein the admixing is effective to unexpectedly enhance the hydrophobicity of the paper sheet. Such admixing can be achieved in any combination as might be practiced by one skilled in the art. Useful considerations include attention to such factors as, for example, an inorganic particle effectively admixed with an acrylonitrile copolymer in a dry state may be difficult to disperse into a slurry, and the like. As an example of a useful scheme, an inorganic particle, such as precipitated calcium carbonate, in slurry form is admixed under agitation with an aqueous solution of a butylacrylate-acrylonitrile copolymer and then introduced into a paper furnish for use in paper making.

The following are further non-limiting examples of embodiments of the present invention.

EXAMPLE 1

Preparation of Precipitated Calcium Carbonate (PCC) Effectively Admixed with an Acrylonitrile Copolymer An aqueous PCC slurry at a temperature of 10 degrees Centigrade to 95 degrees Centigrade is continuously agitated. An acrylic copolymer consisting of butyl acrylate and acrylonitrile which may also contain styrene is added to the PCC slurry under agitation sufficient to maintain a moderate vortex. Solids of this acrylic copolymer dispersion can range from 1.0 percent to greater than 50 percent. After mixing for 10 minutes the resulting product is an acrylonitrile copolymer-PCC system of the present invention.

EXAMPLE 2

Comparison of Effectively and Non-effectively Admixed PCC and Acrylonitrile Copolymer PCC and acrylonitrile copolymer-PCC admixed fillers are used to test the effect on sizing characteristics of the acrylonitrile copolymer-PCC systems against PCC.

Comparative handsheets (74 g/m2) using a Turbulent-Pulse Former (manufactured by Paper Research Materials, Inc.) and a Formax Sheet Former (Noble and Wood type, manufactured by Adirondack Machine Corp.) are prepared from a furnish of 75 percent bleached hardwood and 25 percent bleached softwood Kraft pulps beaten to 400 Canadian Standard Freeness (CSF) at 7 pH in distilled water. Shear speed on the Turbulent-Pulse Former is set at 1250 rpm utilizing a pulp furnish having a consistency of 0.12 percent. Pulp consistency for the Formax is 0.025 percent. Synthetic sizing agent (alkyl ketene dimer or alkenyl succinic anhydride) are added to the pulp at levels of from about 0.1 to about 0.25 percent. Cationic potato starch is added at levels of from about 0.5 to about 0.75 percent. Filler is added to the furnish to achieve a filler content range of from about 5 to about 25 percent in the finished sheets. Retention agent (high molecular weight cationic or anionic polyacrylamide) is added at about 0.025 percent. Distilled water used throughout the process of preparing the handsheets is doped occasionally with 60 ppm calcium in the form of calcium chloride to impart hardness to the water. The sheets are pressed using a nip at a pressure of 25 psi and dried on a rotating chrome-plated drum at a temperature of 125° C. All sheets are conditioned at about 50 percent R.H., and 23° C.

Sizing is tested by the Hercules Size Test (HST) to measure penetration of liquid through the handsheets. The Hercules Size Test (HST) is the test method used to determine the degree of sizing of paper in the instant invention. The test is performed on a Hercules sizing tester model KA or KC, and the test method employed is Tappi Method T-530 PM-89 (revised 1989).

The handsheets are prepared as previously described on a Turbulent-Pulse Former to have 24 percent filler level of PCC, 0.15 percent alkyl ketene dimer, 0.75 percent cationic potato starch, and 0.025 percent anionic polyacrylamide. The results of the HST are shown in Table 1.

TABLE 1

EFFECT ON SIZING OF TREATING FILLER

| FILLERS | HST SIZING (SEC.) |
|---|---|
| PCC | 7 |
| PCC admixed with 4.8 lbs/ton acrylonitrile copolymer added to pulp stock | 93 |
| PCC more effectively admixed with 1 percent acrylonitrile copolymer (eq. to 4.8 lbs/ton) | 350 |

A review of the data shows that effectively admixing the PCC filler material with acrylonitrile copolymer unexpectedly improves the sheet sizing over PCC filler. Greater admixing of the acrylonitrile copolymerized PCC filler material unexpectedly results in improved sheet sizing over adding the same amount of acrylonitrile copolymer to the pulp stock and using untreated PCC.

EXAMPLE 3

Effect of Admixing PCC with Varying Amounts of Acrylonitrile Copolymer in an Alkyl Ketene Dimer (AKD) Sizing System PCC is admixed with different amounts of acrylic polymer to test the effect on sizing of varying the amount of acrylonitrile copolymer used to modify the PCC. The handsheets are made using the Turbulent-Pulse Former and prepared as described in Example 2. The results of the HST test are shown in Table 2.

A review of the data shows that effectively admixing the surface of the PCC with acrylonitrile copolymer improves sizing as compared to ineffective admixing or PCC filler alone. Further review of the data shows that treatment levels of from about 0.50 percent to 2 percent acrylonitrile copolymer by dry weight of PCC provides particularly improved sizing, and optimally, from about 0.5 percent to about 1 percent acrylonitrile copolymer provides the most improved results.

TABLE 2

| filler | surface treatment | % surface treatment added to filler | amount of filler in sheet (%) | sizing HST (sec.) |
|---|---|---|---|---|
| Albacar® HO PCC | None | 0 | 7.8 | 157 |
| Albacar® HO PCC | None | 0 | 16.6 | 61 |
| Albacar® HO PCC | None | 0 | 23.8 | 7 |
| Albacar® HO PCC | butyl acrylate-acrylonitrile copolymer | 0.5 | 7.9 | 216 |
| Albacar® HO PCC | butyl acrylate-acrylonitrile copolymer | " | 16.4 | 225 |
| Albacar® HO PCC | butyl acrylate-acrylonitrile copolymer | " | 24.6 | 115 |
| Albacar® HO PCC | butyl acrylate-acrylonitrile copolymer | 1.0 | 8.1 | 249 |
| Albacar® HO PCC | butyl acrylate-acrylonitrile copolymer | " | 16.1 | 336 |
| Albacar® HO PCC | butyl acrylate-acrylonitrile copolymer | " | 24.0 | 350 |
| Albacar® HO PCC | butyl acrylate-acrylonitrile copolymer | 1.5 | 7.9 | 258 |
| Albacar® HO PCC | butyl acrylate-acrylonitrile copolymer | " | 15.8 | 388 |
| Albacar® HO PCC | butyl acrylate-acrylonitrile copolymer | " | 24.4 | 515 |
| Albacar® HO PCC | butyl acrylate-acrylonitrile copolymer | 2.0 | 8.1 | 261 |
| Albacar® HO PCC | butyl acrylate-acrylonitrile copolymer | " | 16.1 | 434 |
| Albacar® HO PCC | butyl acrylate-acrylonitrile copolymer | " | 23.9 | 567 |

Albacar® is a registered trademark of Minerals Technologies, Inc.
Albacar® HO PCC is commercially available from Minerals Technologies, Inc., 405 Lexington Avenue, New York, NY.

EXAMPLE 4

Effect of Admixing PCC with Acrylonitrile Copolymer in a Rosin Sizing System

PCC is admixed with 1 percent acrylic copolymer to test the effect of sizing using a neutral rosin size (Neutros Extra—EKA Chemicals Inc.) at a final sheet pH of 6.5–7.0. Handsheets are made using the Formax (Noble and Wood) and contain 0.75 percent cationic starch, 0.45 percent rosin size, 0.66 percent alum, and 0.025 percent cationic polyacrylamide retention aid. PCC is added to the sheets at approximately 16 percent and 25 percent. The results of the HST are shown in Table 3.

TABLE 3

| filler | surface treatment | amount of filler in sheet (%) | sizing HST (sec.) |
|---|---|---|---|
| Albacar® LO PCC | None | 16.1 | 126 |
| Albacar® LO PCC | None | 24.6 | 6 |
| Albacar® LO PCC | 1 percent butyl acrylate-acrylonitrile copolymer | 17.8 | 768 |
| Albacar® LO PCC | 1 percent butyl acrylate-acrylonitrile copolymer | 25.9 | 781 |

A review of the data shows that effective admixing the PCC with acrylic copolymer unexpectedly improves sizing as compared to filler alone.

EXAMPLE 5

Effect of Admixing PCC with Acrylonitrile Copolymer in a Alkenyl Succinic Anhydride (ASA) Sizing System PCC is admixed with 0.75 percent acrylic copolymer to test the effect of sizing in an ASA sizing system. Handsheets are made using the Turbulent-Pulse Former and contain 0.75 percent cationic starch, 0.10 percent ASA, and 0.025 percent anionic polyacrylamide retention aid. PCC is added to the sheets at approximately 8 percent, 16 percent, and 24 percent. The results of the HST are shown in Table 4.

TABLE 4

| filler | co-component | amount of filler in sheet (%) | sizing HST (sec.) |
|---|---|---|---|
| Albacar® HO PCC | None | 7.4 | 67 |
| Albacar® HO PCC | None | 16.3 | 50 |
| Albacar® HO PCC | None | 24.5 | 12 |
| Albacar® HO PCC | 0.75 percent butyl acrylate-acrylonitrile copolymer | 7.3 | 108 |
| Albacar® HO PCC | 0.75 percent butyl acrylate-acrylonitrile copolymer | 16.0 | 194 |
| Albacar® HO PCC | 0.75 percent butyl acrylate-acrylonitrile copolymer | 24.8 | 234 |

A review of the data shows that effectively admixing the PCC with acrylonitrile copolymer improves the ASA sizing efficiency of papers made with this type of PCC.

EXAMPLE 6

Effect of Admixing PCC with Acrylonitrile Copolymer in a Groundwood Containing System PCC admixing with 1.0 percent acrylic copolymer is used to test the effect of sizing in an unsized groundwood furnish. Handsheets are made using the Turbulent-Pulse Former in a furnish consisting of 70 percent TMP fiber and 30 percent softwood Kraft fiber, and containing 0.75 percent cationic starch, 0.25 percent cationic polyamine retention aid and 0.075 percent cationic polyacrylamide retention aid. PCC is added to the furnish so that 25 percent filler remains in the sheets. All handsheets are calendered at 1,500 pli, 4 passes at 175 F., 8 percent moisture. Water absorbency is tested to determine the rate of water absorption of an unsized paper. The test method to be employed is Tappi Method UM-596. The results of the water drop test for sizing is shown in Table 5.

TABLE 5

| | | water drop test | |
|---|---|---|---|
| filler | surface treatment | top side (sec.) | bottom side (sec.) |
| Albacar ® HO PCC | None | 45 | 36 |
| Albacar ® HO PCC | 1.0 butyl acrylate-acrylonitrile copolymer | 82 | 73 |

The data shows that treating PCC with acrylonitrile copolymer significantly improves the water drop sizing of the sheet compared to untreated filler. This will improve the offset printability of the sheet.

What is claimed is:

1. A method consisting of effectively admixing an inorganic filler particle and an acrylonitrile copolymer having a comonomer selected from the group consisting of butylacrylate monomer, butylmethacrylate monomer, 2-ethylhexylacrylate monomer, 2-hydroxyethylacrylate monomer, methylmethacrylate monomer, styrene monomer, and vinylacrylate monomer and then introducing said admixture to a paper furnish to form a modified paper furnish and forming a paper sheet from said modified paper furnish, wherein said modified paper furnish is effective to enhance the hydrophobicity of said paper sheet.

* * * * *